Nov. 8, 1927.
B. O. RHODES
1,648,029
DISPENSING RECEPTACLE
Filed April 9, 1925
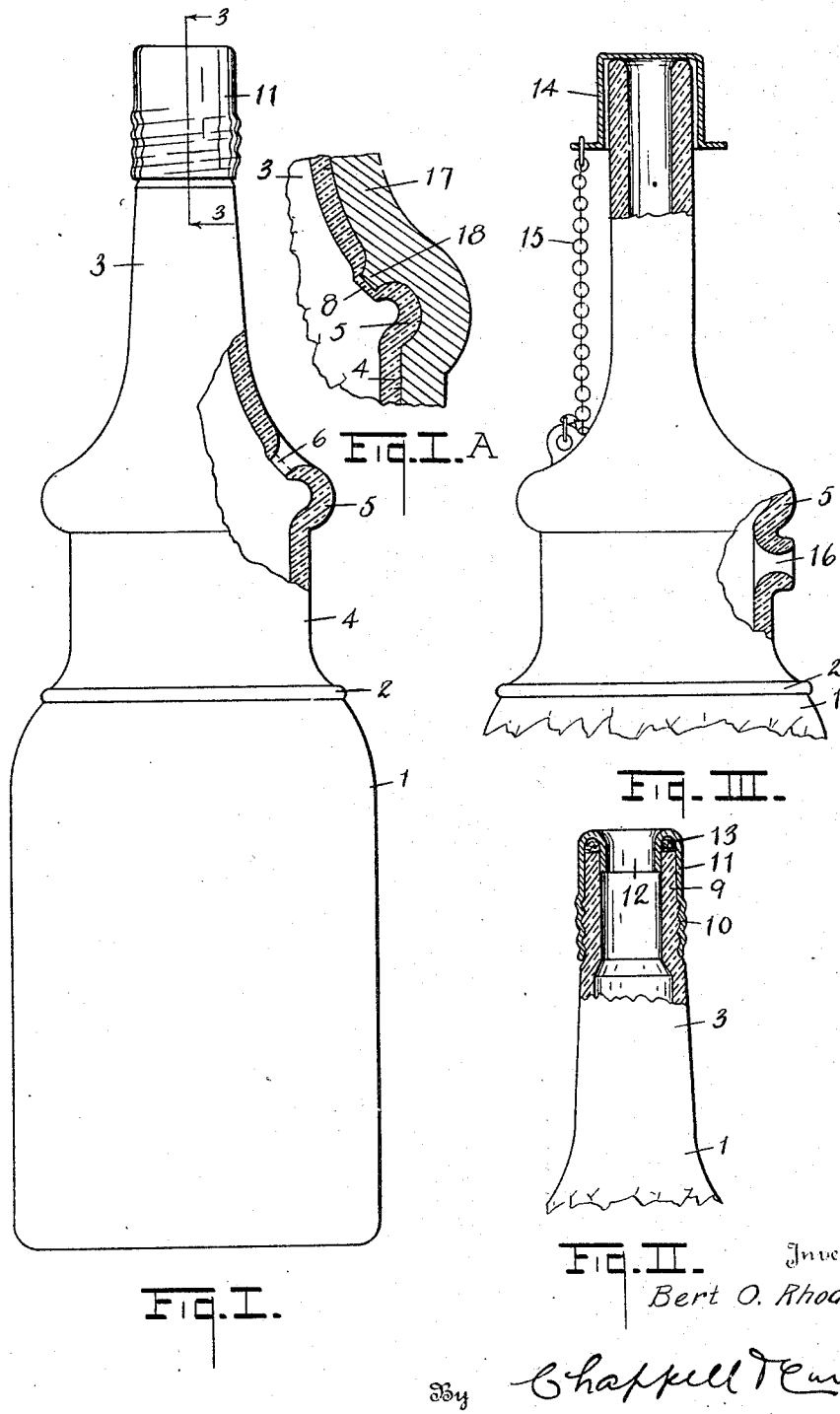

Patented Nov. 8, 1927.

1,648,029

UNITED STATES PATENT OFFICE.

BERT O. RHODES, OF KALAMAZOO, MICHIGAN, ASSIGNOR, BY MESNE ASSIGNMENTS, TO JAY B. RHODES COMPANY, OF KALAMAZOO, MICHIGAN.

DISPENSING RECEPTACLE.

Application filed April 9, 1925. Serial No. 21,850.

This invention relates to improvements in dispensing receptacles and method of making.

My improved dispensing receptacle or bottle is especially designed for the handling of lubricant such as in the sale of lubricant at service stations to motorists where the lubricant is poured into the crank case or lubricant receptacle of an automobile.

The main objects of the invention are:

First, to provide a dispensing receptacle or bottle which may be made entirely of glass and has an integral spout permitting the filling of the receptacle as by means of a measuring pump and to control the discharge of the lubricant.

Second, to provide an improved method of manufacturing or making dispensing receptacles.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side elevation of a receptacle or bottle embodying the features of my invention, parts being broken away to show structural details.

Fig. I$^A$ is a fragmentary section illustrating one step of my method of manufacturing the dispensing receptacles.

Fig. II is a detail section on a line corresponding to line 3—3 of Fig. I.

Fig. III is a fragmentary side elevation partially in section of a modified construction.

In the drawing similar reference characters refer to similar parts in all of the views.

Referring to the drawing, the receptacle 1 is of such dimensions as to contain the desired amount of lubricant or the like, the receptacle being preferably provided with a bead 2 indicating the filling line.

The receptacle has an integral neck comprising an outwardly tapered spout portion 3, a cylindrical portion 4 at the base thereof with a bead-like enlargement 5 between the tapered spout portion and this cylindrical portion. By thus forming the neck it is convenient for grasping, the cylindrical portion and bead forming a convenient handhold.

The neck is provided with a vent opening 6 which is preferably disposed above the bead or enlargement 5 so that the thumb of the hand grasping the bottle may be used to finger the vent.

In Fig. I$^A$, I illustrate one step in my improved method of manufacturing dispensing receptacles. The bottle is molded or blown into a mold 17 having a boss-like projection 18 around which the glass is molded, there being a relatively thin web 8 at the inner end of this boss. When the mold is removed, this thin web may be broken away by means of a suitable punch or the like, leaving the vent opening 6. This is a very simple and effective way of producing my improved dispensing receptacle.

In the embodiment shown in Figs. I and II, the spout terminates in a cylindrical portion 9 at its outer end threaded at 10 to receive the protecting sleeve 11. This sleeve is threaded upon the spout and has an inturned flange 12 projecting into the spout, a packing 13 being arranged at the end of the spout. This protects the glass spout so that it is not likely to be chipped or broken when it is introduced into the filling opening of a crank case or when the bottle is filled by means of a measuring pump, the bottle being held in proper relation to the discharge spout of the measuring pump. This, however, is omitted in the structure shown in Fig. III in which a cap 14 is provided, the cap being connected by the chain 15 to the bottle. In this modification, the vent opening 16 is formed in the neck below the bead in which position the palm of the hand may be used to control the vent.

My improved dispensing receptacle is very economical to produce and very efficient and convenient in use. It also has the advantage of being very attractive in appearance when the contents are visible to the purchaser.

Having thus described my invention what I claim as new and desire to secure by Letters Patent is:

1. A dispensing receptacle having an integral neck comprising an outwardly tapered spout portion and a cylindrical portion at the base of the spout, there being a bead-like enlargement between said spout and cylindrical portion, said neck having a vent opening above and adjacent said enlargement whereby the bottle may be filled with lubricant or the like through the spout as with a force pump and the vent fingered in discharging.

2. A dispensing receptacle having an integral neck compring an outwardly tapered spout portion and a cylindrical portion at the base of the spout, there being a bead-like enlargement between said spout and cylindrical portion, said neck having a vent opening whereby the bottle may be filled with lubricant or the like through the spout as with a force pump and the vent fingered in discharging.

3. A glass dispensing receptacle having a neck portion terminating in a spout portion with a reduced externally threaded portion at its outer end, said neck having a vent opening therein, and a metal protecting sleeve threaded upon the reduced end of said spout and having an inturned flange projecting into the spout, there being a packing between said flange and the end of the spout.

4. A glass dispensing receptacle having an integral neck with a vent opening therein, and a metal protecting sleeve on the end of said neck having an inturned flange projecting into the spout, there being a packing between said flange and the end of the spout.

In witness whereof I have hereunto set my hand.

BERT O. RHODES.